US010436918B2

(12) United States Patent
Stephenson et al.

(10) Patent No.: US 10,436,918 B2
(45) Date of Patent: *Oct. 8, 2019

(54) INTEGRATED COUPLING OF SCINTILLATION CRYSTAL WITH PHOTOMULTIPLIER IN A DETECTOR APPARATUS

(71) Applicant: Schlumberger Technology Corporation, Sugar Land, TX (US)

(72) Inventors: Ken Stephenson, New Castle, VA (US); Peter Wraight, Skillman, NJ (US); Wolfgang Ziegler, Hightstown, NJ (US); John J. Simonetti, Hamilton, NJ (US); Christian Stoller, Sugar Land, TX (US); Irina Molodetsky, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,695

(22) Filed: Jan. 5, 2018

(65) Prior Publication Data

US 2018/0210095 A1   Jul. 26, 2018

Related U.S. Application Data

(63) Continuation of application No. 14/355,762, filed as application No. PCT/US2011/058337 on Oct. 28, 2011, now Pat. No. 9,880,295.

(Continued)

(51) Int. Cl.
*G01T 1/20*   (2006.01)
*G01T 1/202*  (2006.01)
(Continued)

(52) U.S. Cl.
CPC .......... *G01T 1/2023* (2013.01); *G01T 1/2006* (2013.01); *G01V 5/04* (2013.01); *H01J 40/18* (2013.01)

(58) Field of Classification Search
CPC ...... G01T 1/2023; G01T 1/2006; H01J 40/18; G01V 5/04
(Continued)

(56) References Cited

U.S. PATENT DOCUMENTS 4,107,534 A   8/1978  Piltingsrud
4,410,843 A  10/1983  Sauer et al.
(Continued)

FOREIGN PATENT DOCUMENTS

EP   0690501 A2   1/1996
EP   0690501 A3   3/1997
(Continued)

OTHER PUBLICATIONS

International Search report and written opinion issued in the related PCT application PCT/US2011/058337, dated Jun. 11, 2012 (7 pages).
(Continued)

*Primary Examiner* — David P Porta
*Assistant Examiner* — Gisselle M Gutierrez
(74) *Attorney, Agent, or Firm* — Sara K. M. Hinkley

(57) ABSTRACT

A scintillator type radiation detector package is provided including a scintillation crystal directly coupled to the window of a photomultiplier. A scintillator package is also provided having a longer life at wellbore temperature with minimal deterioration of a hygroscopic scintillation crystal(s). Direct optical coupling of the scintillator to the photomultiplier reduces the amount of light lost at coupling (Continued)

interfaces and improved detection resolution over the conventional structures having separate packages for crystal and photomultiplier.

20 Claims, 8 Drawing Sheets

Related U.S. Application Data

(60) Provisional application No. 61/407,821, filed on Oct. 28, 2010.

(51) Int. Cl.
    *G01V 5/04* (2006.01)
    *H01J 40/18* (2006.01)

(58) Field of Classification Search
    USPC .................................................. 250/361 R
    See application file for complete search history.

(56) References Cited

U.S. PATENT DOCUMENTS

| | | | |
|---|---|---|---|
| 4,535,587 A | 8/1985 | Rias | |
| 4,554,481 A | 11/1985 | Faulkner et al. | |
| 4,799,350 A | 1/1989 | Rias | |
| 5,114,454 A | 5/1992 | Promper et al. | |
| 5,696,665 A | 12/1997 | Nagy | |
| 5,744,803 A | 4/1998 | Grodsinsky et al. | |
| 5,869,836 A | 2/1999 | Linden et al. | |
| 5,961,714 A | 10/1999 | Melcher et al. | |
| 5,962,855 A | 10/1999 | Frederick et al. | |
| 6,222,192 B1 | 4/2001 | Sekela et al. | |
| 6,355,932 B1 | 3/2002 | Frederick | |
| 6,359,282 B1 | 3/2002 | Sekela | |
| 6,466,446 B1 | 10/2002 | Nagy et al. | |
| 6,800,018 B2 | 10/2004 | Tricard et al. | |
| 6,858,791 B2 | 2/2005 | Erban | |
| 7,034,305 B2 | 4/2006 | Frederick et al. | |
| 7,321,123 B2 | 1/2008 | Simonetti et al. | |
| 7,675,040 B2 | 3/2010 | Menge et al. | |
| 7,714,287 B1 | 5/2010 | James et al. | |
| 7,767,975 B2 | 8/2010 | Flamanc et al. | |
| 7,884,316 B1 | 2/2011 | Menge et al. | |
| 8,415,016 B2 | 4/2013 | Huignard et al. | |
| 2003/0209671 A1 | 11/2003 | Frederick et al. | |
| 2005/0254190 A1 | 11/2005 | Kwon et al. | |
| 2006/0087629 A1 | 4/2006 | Stone-Sundberg et al. | |
| 2009/0140153 A1 | 6/2009 | Flamanc et al. | |
| 2009/0261257 A1 | 10/2009 | Menge | |
| 2009/0278052 A1 | 11/2009 | Frank et al. | |
| 2009/0324968 A1 | 12/2009 | Huignard et al. | |
| 2010/0090111 A1* | 4/2010 | Stoller | G01T 1/20 250/337 |
| 2010/0193690 A1 | 8/2010 | Hunt | |
| 2011/0001054 A1 | 1/2011 | Frank et al. | |
| 2011/0017914 A1 | 1/2011 | Flamanc et al. | |
| 2012/0161011 A1 | 6/2012 | Menge et al. | |
| 2014/0325828 A1* | 11/2014 | Stoller | G01V 5/04 29/592.1 |
| 2015/0014544 A1 | 1/2015 | Stephenson et al. | |

FOREIGN PATENT DOCUMENTS

| | | |
|---|---|---|
| EP | 0831338 A1 | 8/1997 |
| EP | 0930378 A1 | 7/1999 |
| EP | 0982602 A2 | 3/2000 |
| EP | 0831338 B1 | 7/2002 |
| WO | WO2003068450 A2 | 8/2003 |
| WO | WO2004086826 A2 | 10/2004 |
| WO | WO2006047127 A1 | 5/2006 |
| WO | WO2010144227 A2 | 12/2010 |

OTHER PUBLICATIONS

International preliminary report on patentability issued in the related PCT application PCT/US2011/058337, dated Apr. 30, 2013 (5 pages).

* cited by examiner

INTEGRATED COUPLING OF SCINTILLATION CRYSTAL WITH PHOTOMULTIPLIER IN A DETECTOR APPARATUS

CROSS-REFERENCE TO RELATED APPLICATIONS

This Application is a Continuation of U.S. Non-Provisional Application Serial No. 14/355762, which was filed Sep. 15, 2014, which is a National Stage Entry of PCT/US2011/058337, filed Oct. 28, 2011, which claims benefit of and priority to U.S. Provisional Application Serial No. 61/407821, filed Oct. 28, 2010. The entirety of the foregoing is incorporated herein by reference.

BACKGROUND

Conventional radiation (e.g., gamma-ray) detectors for wellbore formation measurement ("well logging") typically include a packaged photomultiplier ("PMT") and scintillation crystal. The most common scintillation crystal is thallium-activated sodium iodide, NaI(Tl), which is a hygroscopic material and must be protected from moisture. Consequently, such NaI(Tl) crystals are typically packaged in a hermetically sealed container having an optical window to allow light to escape. The crystal is optically coupled to the interior surface of an optically transparent window in the container, typically with a clear silicone elastomer. This packaging method increases the number of optical interfaces, which causes a loss of light and detector resolution. Some concepts to improve the optical efficiency of the foregoing crystal packaging including, e.g., the development claimed in U.S. Pat. No. 7,321,123 (Simonetti et al.) incorporated herein by reference and also owned by the assignee of the present invention. In the approach of this patent, the scintillator crystal replaces an optical faceplate in the container and the photocathode of the PMT is directly deposited on the scintillator.

To construct a gamma-ray detector, in the typical detector, the exterior surface of the crystal container window is coupled optically to an exterior window of the photomultiplier (PMT), again using a clear silicone elastomer. For light generated within the scintillation crystal to reach the photocathode of the photomultiplier (PMT), it must pass through five interfaces: two on the optical coupling between scintillator and the scintillation crystal container window, two on the optical coupling between crystal container window and the PMT window, and one between the PMT window and the photocathode of the PMT. At each interface, only a fraction of the light is transmitted, while reflected light may be eventually re-reflected back toward the interface or it may be absorbed within the various optical media and thereby lost. It is advantageous to reduce the number of optical interfaces between the scintillation crystal and the photocathode of the PMT as this will reduce the amount of reflected light and therefore increase the amount of light that reaches the photocathode. Increasing the amount of light reaching the photocathode will improve the gamma-ray resolution and increase the signal-to-noise ratio as long as other parameters, such as photocathode quantum efficiency, are equal.

St. Gobain, a supplier of scintillator crystals, has published brochures describing "integrated" detectors in which an entire photomultiplier and scintillator are packaged together in a common hermetically sealed housing. Similar "integrated detectors" are also sold by GE-Reuter Stokes. Such a system also has only three optical interfaces as described above. However, the foregoing identified systems each has deficiencies with respect to shock-induced noise. This type of noise typically is produced by flexing of the optical coupling or scintillation crystal with the resultant emission of light as a result of the mechanical stress applied to the scintillator crystal. In the St. Gobain scintillation detector structure, the mass of the scintillation crystal and the mass of the PMT are disposed on either side of an optical coupling, and a shock, whether axial or lateral, will generate slight movement of the crystal and the PMT with respect to each other, and emit shock-induced light in the process. An additional disadvantage of the foregoing structure, in particular for LWD/MWD applications, is that the PMT needs to be surrounded by shock absorbing materials inside the housing. Outgassing of the shock absorbing material can damage the reflector, the optical coupling and can lead to an early failure of the PMT. For some very reactive scintillator material reactions with outgassing products may tarnish the scintillator surface and degrade the scintillator performance.

SUMMARY

One aspect of the invention is a scintillator package including means to couple a scintillation crystal directly to the window of a photomultiplier (PMT). In the present aspect of the invention a scintillator package has a longer life at wellbore temperature with minimal, if any, deterioration of a hygroscopic scintillation crystal(s). Direct coupling of the crystal to the PMT can reduce the amount of light lost at coupling interfaces and can improve gamma-ray resolution over a conventional structure having separate packages for the crystal and photomultiplier. Also, the reduced light attenuation allows operation with higher thermal (dark) emission and therefore allows operation at higher temperatures than conventional packaging. In addition, the coupling structure according to this aspect of the invention can provide enhanced resistance to shock-induced noise that is common in operation of such devices in a wellbore drilled through subsurface formations.

DETAILED DESCRIPTION

In one example of the present invention, the number of optical interfaces is reduced from five to three: two interfaces are provided on the optical coupling between the scintillation crystal and the PMT window, and one interface is provided between the PMT window and the photocathode of the PMT. This differs from a device known as the "scintiplier", as described in U.S. Pat. No. 7,321,123, which has only one interface between the crystal and photocathode. However, in the detector disclosed in the '123 patent, there are very few materials that can function as both scintillation crystal and PMT window, whereas in the present invention, any know scintillation detector material can be used.

In the present invention, the scintillation crystal may be contained in a package that connects directly to the PMT window flange. This effectively decouples the PMT mass from the optical coupling pad and reduces the potential of shock induced noise. In addition, the PMT of the current invention has an extremely rugged sapphire/metal/ceramic structure, so the crystal can be loaded with high compressive force within the crystal housing, greatly reducing any crystal movement that would produce shock-induced counts. Such a high compressive force would break a glass PMT envelope of the previous integrated designs.

Figure 1:
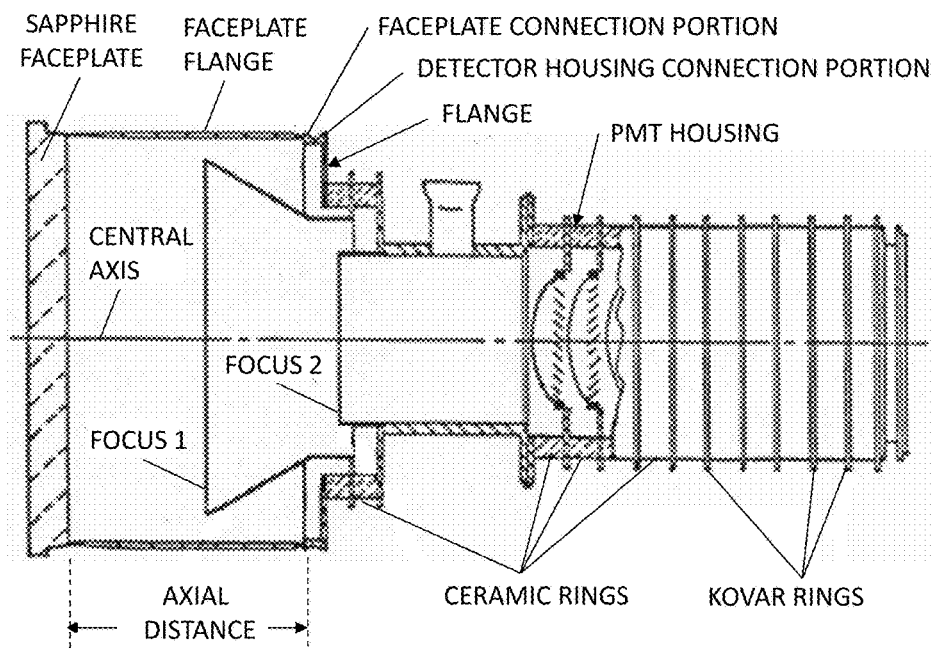
FIG. 1 shows a possible construction of a PMT with weld flange to attach a crystal housing.
Figure 2:
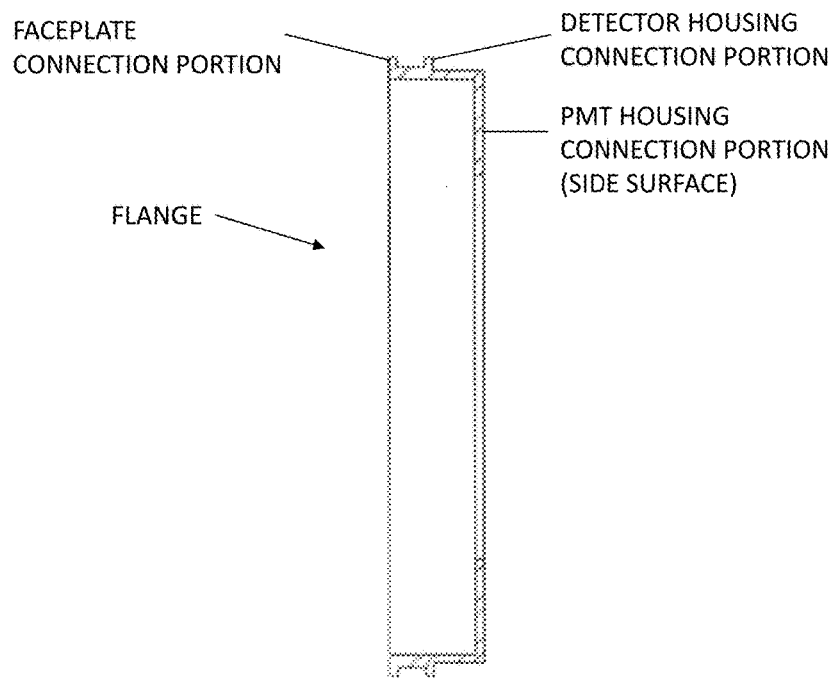
FIG. 2: shows a weld flange of the embodiment shown in FIG. 1
Figure 3:
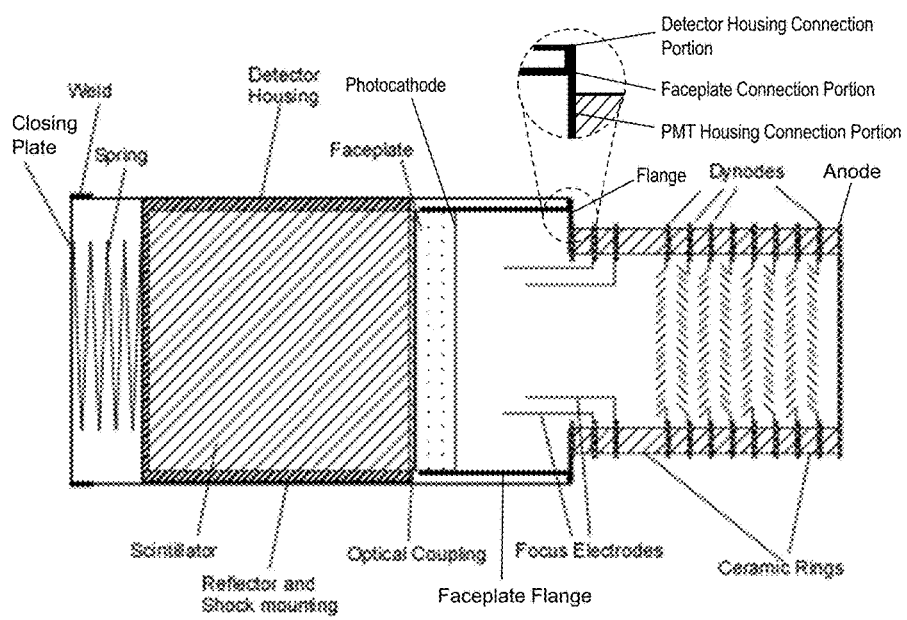
FIG. 3 shows integration of a ceramic PMT with a scintillator coupled directly to the faceplate.

One example of the present invention includes a photomultiplier ("PMT") having a sapphire optical window and a metal and ceramic brazed housing (see FIG. 1). The sapphire window (faceplate) is brazed to a cylindrical flange that is, in turn, welded onto a faceplate weld flange. A cross-sectional view of an example embodiment of this flange is shown in FIG. 2. In one method of enclosing the scintillation crystal, a cylindrical housing is welded onto the integration flange, FIG. 3, below the PMT head. The scintillation crystal and its optical coupling are loaded through the open end of the housing and sealed with an end cap. Typically, the end cap contains a spring to apply compressive force to the scintillation crystal, and the threaded housing provides a mechanism to apply the compressive force. Additionally, optically reflective material such as one sold under the trademark TEFLON®, which is a registered trademark of E.I. du Pont De Nemours & Co., Wilmington, Del., may be disposed in a gap between the scintillation crystal and the housing to reflect light back toward the photomultiplier and to provide a shock absorptive mount for the crystal. Finally, the end of the end cap may be welded to the end of the housing to form a hermetic seal. Typically, the entire crystal loading procedure is performed in an inert gas atmosphere, such as argon, to prevent deterioration of hygroscopic scintillation crystals. Hygroscopic crystal compositions may include, for example, NaI(Tl), LaBr$_3$:Ce, LaCl$_3$:Ce, CsI (Na), CsI(Tl), mixed La-halides, elpasolites (such as CLYC etc), SrI$_2$:Eu and others known in the art.

The crystal/PMT package of the present invention is not limited to use of only hygroscopic scintillator crystals. The same package and mounting method can be used for non-hygroscopic scintillator crystals. Useful non hygroscopic crystals may include BGO, LSO:Ce, GSO:CE, YAP:Ce, YAP:Pr, LuAP:Ce, LuAG:Pr, as well as others known in the art, for example Li$^6$ doped glass. When such types of crystals are used, a hermetic seal may not be required. However hermetic sealing even in the case of non-hygroscopic crystals may reduce premature deterioration of the reflector material in particular when the packages are exposed to high temperatures.

Welding the end cap, while being one preferred method, is not the only approach to form a seal. It is also possible to use other sealing techniques using adhesives, low temperature solder, O-ring seals or similar techniques known in the art. In some cases, the joining and sealing technique may include cold welds or the use of metal seals.

Figure 4:
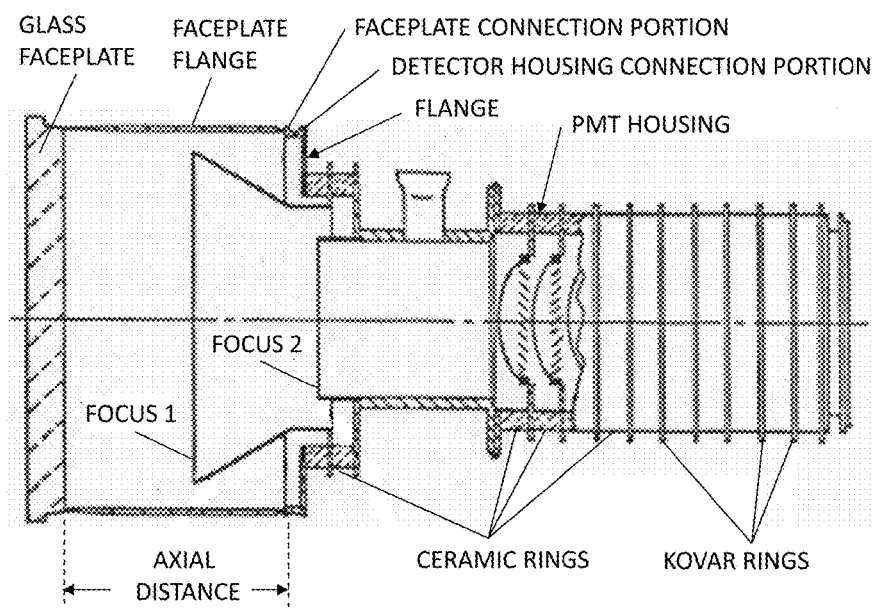
FIG. 4 shows a PMT with a glass faceplate.

Other example implementations are also possible. In an alternate example, FIG. 4 shows a PMT with a glass window instead of a sapphire window but, otherwise, the arrangement is similar to that described previously.

Figure 5:
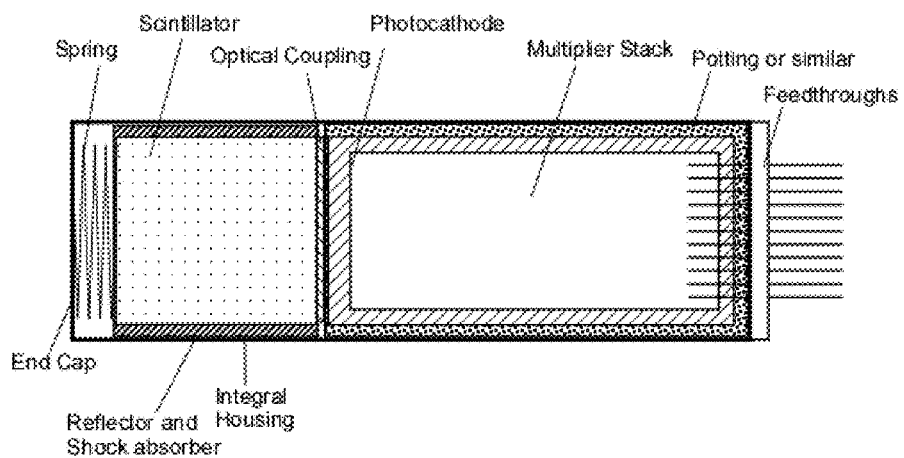
FIG. 5 shows a sealed integrated detector package known in the art.

The examples disclosed in the previous paragraphs include one structure for integrating a scintillation crystal in a hermetically sealed environment directly optically coupled to a PMT. The structure of the PMT lends itself for this kind of integration. However, in an alternative example, a glass PMT may be used, albeit of a more complex construction. As mentioned above, present integrated detectors based on glass PMTs enclose the entire glass envelope in an hermetic enclosure. This type of construction is outlined in FIG. 5. In addition to the issues mentioned above, such a construction puts the entire PMT in compression and the enclosure will typically include potting material that could outgas at higher temperatures and possibly damage the scintillator and/or photomultiplier.

Figure 6:
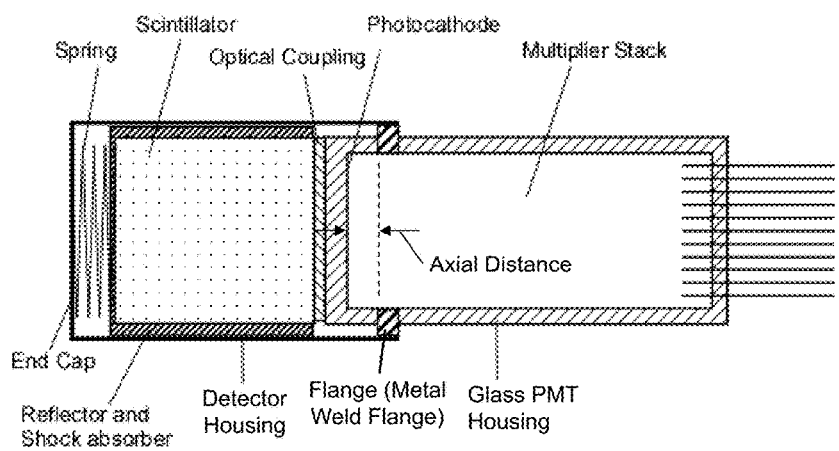
FIG. 6 shows a modified glass tube with integrated package according to one example of the invention.

In another example, the construction of the glass envelope could be modified by adding an intermediate metal ring to the envelope, which would serve as a surface for attaching a scintillator housing. An outline of such an approach is shown in FIG. 6. Instead of using an intermediate metal ring that bisects the envelope, the metal ring could also be simply resting in a groove on the outside of the envelope, leaving the inside of the glass envelope intact. The ring would thus be hermetically sealed to the glass envelope.

Two embodiments of methods of assembly will be described; however, these are examples only, and the scope of the invention is not limited to these two example methods. In one method, an open metal can is attached to the metal ring on the PMT by means of welding, chemical adhesion, soldering or other appropriate attachment methods before the processing (application of the photocathode) of the PMT. The optical coupling and scintillator may be installed and the end cap may be attached and hermetically sealed by an appropriate sealing method on the finished PMT.

In a second alternative example, the scintillator, optical coupling, etc. may be installed on the PMT faceplate and then a cylinder with a closed end is fit over the assembly and welded or otherwise attached to the metal ring on the processed PMT. The latter method may have the advantage of being a simpler assembly, but sealing techniques such as welding may elevate the temperature close to the photocathode and may increase the possibility of damage to the photocathode. The foregoing assembly methods mentioned herein apply equally to ceramic and glass PMT constructions.

An alternative approach to the method mentioned above is to install the scintillator crystal with its reflector, shock absorber and compression spring in a cylindrical housing before assembling it with the PMT. In either case, a possible advantage of such construction is the accessibility of the PMT optical window. This allows improved cleaning and preparation of the optical window surface before assembly. Proper heat sinking should to be used during assembly to ensure that the photocathode does not get damaged during welding.

In many applications, including well logging, the PMT can be run with negative high voltage (HV), i.e., the photocathode is operated at a negative high voltage, while the anode is kept at ground potential. This allows DC coupling of the anode output to the following preamplifier and analysis circuitry. The present invention can be used in the foregoing configuration. However, the entire detector housing would be at negative HV (up to about 2000 V) in such a configuration. This requires proper insulation and precautions in the construction to avoid HV leakage from the cathode. On the other hand the approach eliminates issues that may be experienced due to the very high field stresses in previously known assemblies where ground potential and cathode high voltage are very close together.

Figure 7:
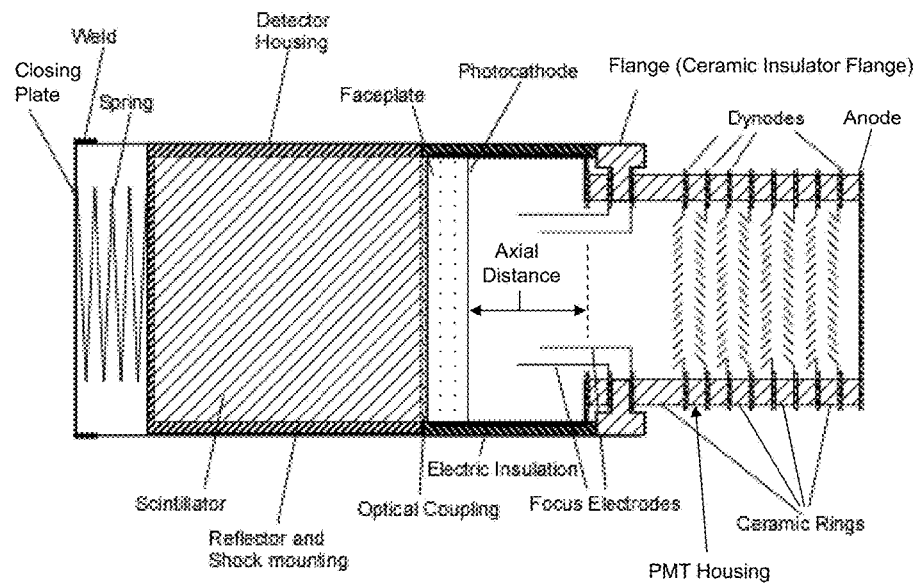
FIG. 7 shows insulated mounting of the detector housing according to one example of the invention.

The foregoing disadvantages could be alleviated by attaching the scintillator housing to an insulator, such as a ceramic ring. One possible approach is shown in FIG. 7. The detector housing is mounted on an extended ceramic ring (or other insulating structure that can be hermetically sealed). This makes it possible to keep the detector housing at ground potential. Sufficient insulation needs to be provided to make sure that there are no leakage currents between the photocathode and ground. This approach has the same issues as previously known detectors that operate at negative high voltage. As in this construction there is a possibility that the electric field at least at the edge of the photocathode is affected by the presence of the high voltage nearby and this may affect the quantum efficiency of the device and/or the dark current. This problem could be alleviated by extending the mounting cylinder of the faceplate beyond the faceplate as shown in FIG. 7

Figure 8:
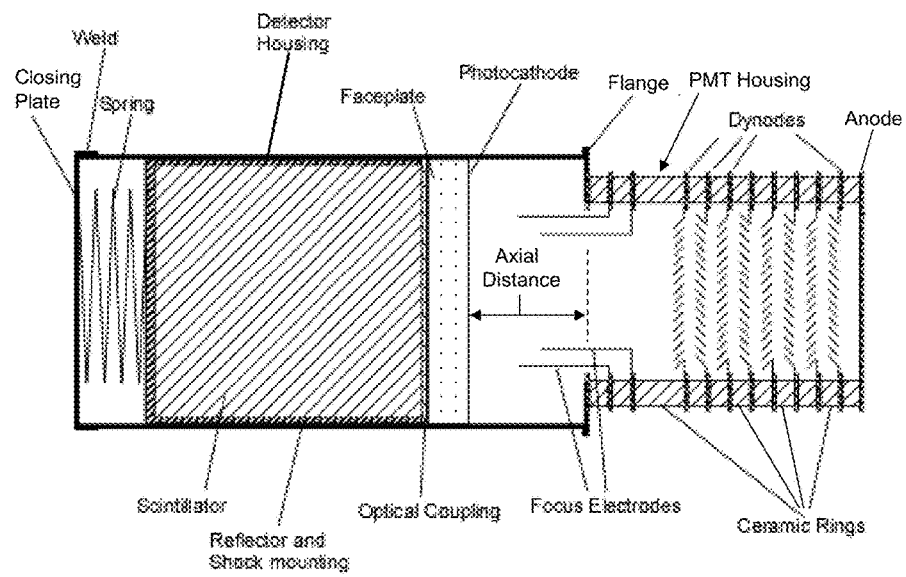
FIG. 8 shows an example of mounting inside an extended faceplate support.

In yet another example, the support for the faceplate and the container for the scintillator could be the same structure. One such example embodiment is shown in FIG. 8. In all such embodiments, a welded endplate is shown. Other embodiments for this structure are equally possible, including but not limited to welding a half cylinder with the endplate already attached to an open half cylinder, thereby moving the weld to a location intermediate between the bottom and the top of the can. Generally, welding very close to the faceplate should be avoided after the photocathode has been deposited.

In many cases, metal-ceramic PMTs are constructed of Alumina ceramic and nickel ferrous alloys. One example of such an alloy is a nickel-cobalt ferrous known as KOVAR® which is a registered trademark of Carpenter Technology Corp., or the like, because of the closely matched coefficients of thermal expansion. The weld flange would typically be attached to the KOVAR® material rings through brazing or welding. The material of the scintillator housing can be any material suitable to contain a scintillator. Typical materials include stainless steel, titanium and aluminum using suitable joining techniques. The selection could also include ceramic materials or plastics using suitable sealing techniques. In some embodiments, where a direct joint between two materials is not possible, an intermediate material component may be used to join the two.

Figure 9:
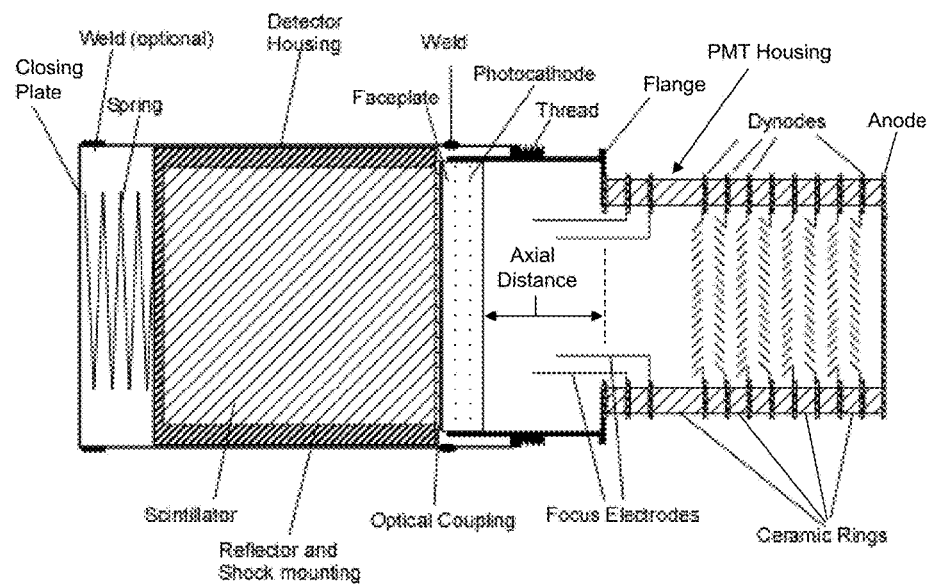
FIG. 9 shows an alternative embodiment with a prefabricated part with machined groove between weld flange and window to assure minimal temperature rise at the photocathode.
Figure 10:
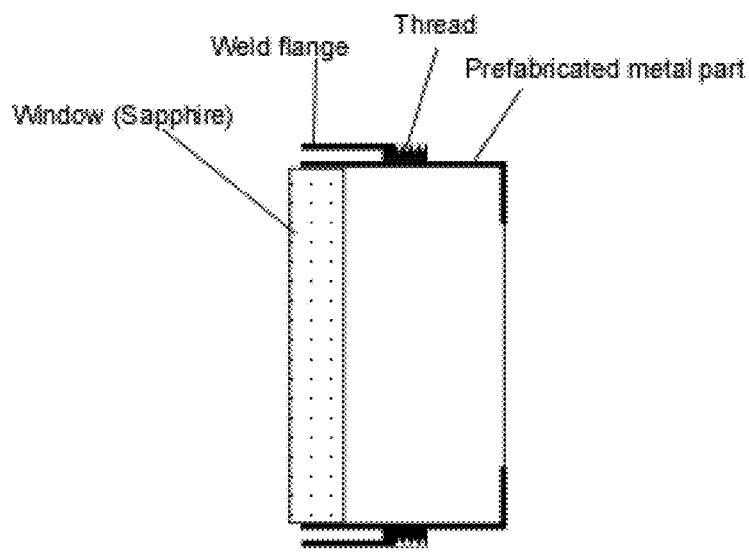
FIG. 10 shows a prefabricated PMT head according to FIG. 9.

FIG. 9 shows a PMT with a head with a machined weld flange. This avoids a weld process, on the thin material of the head, which could cause a change in dimensions and/or weaken the material. A groove is machined between the place where the sapphire is attached and the weld lip to prevent excessive heating of the photocathode during the weld process. The thick material below the limit serves as a heat sink and can also be provided with a thread so that the PMT housing can be threaded on providing a very stable mechanical connection and enhanced shock resistance. A prefabricated PMT head is shown in FIG. 10.

Figure 11:
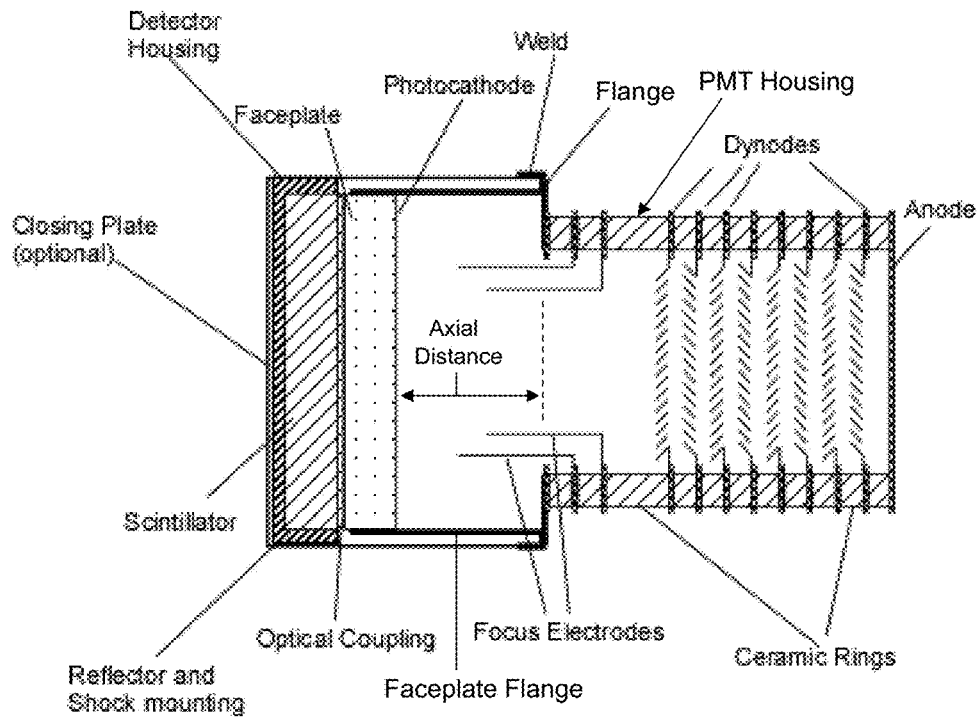
FIG. 11 shows an example of mounting of the scintillator without a crystal.

FIG. 11 shows an example which may be particularly suited for smaller and/or lighter scintillation crystals. Such scintillators can be directly attached to the faceplate using an optical coupling agent (transparent adhesive, silicone etc). The bond obtained with this technique is strong enough to hold the scintillator in place even in the absence of a retaining spring. The elimination of the spring component brings the front face of the scintillator closer to the end of the housing and reduces the amount of material between the scintillator and a radiation source. This enhances the detection probability, particularly for lower energy radiation. A single weld may be sufficient to attach the cap over the scintillator. In addition, the end cap can be slightly bent inward to provide a small amount of retaining force on the scintillator.

Figure 12:
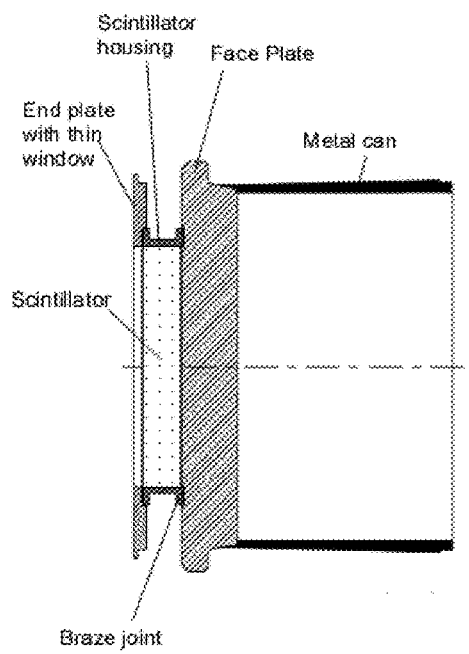
FIG. 12 shows an example PMT head with a 'shallow' crystal housing brazed to a window (KOVAR material and/or sapphire), closing window not shown.

FIG. 12 shows an example which seals the scintillator housing against the faceplate of a PMT. Operating at negative HV does not require an insulating layer, allowing for a smaller diameter detector. Combination crystal mountings, as shown in FIG. 11, and housings, as shown in FIG. 12, having very thin entrance windows brazed to the crystal housing, were built to be used as as low energy, high temperature x-ray detectors.

Figure 13:
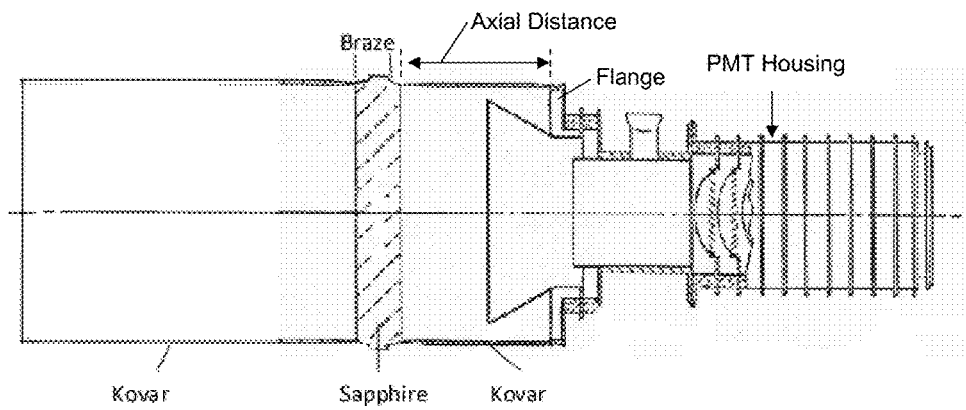
FIG. 13 shows a PMT on the right with the crystal housing on left. The KOVAR material head of the PMT and the crystal housing are both brazed to the same sapphire window.

FIG. 13 shows an embodiment in which the scintillator housing is brazed to the same sapphire window as the KOVAR® material window support cylinder of the PMT. The scintillator housing may be likewise constructed of KOVAR® material so as to match the expansion coefficient of the sapphire, but other metals can also be used.

Figure 14A:
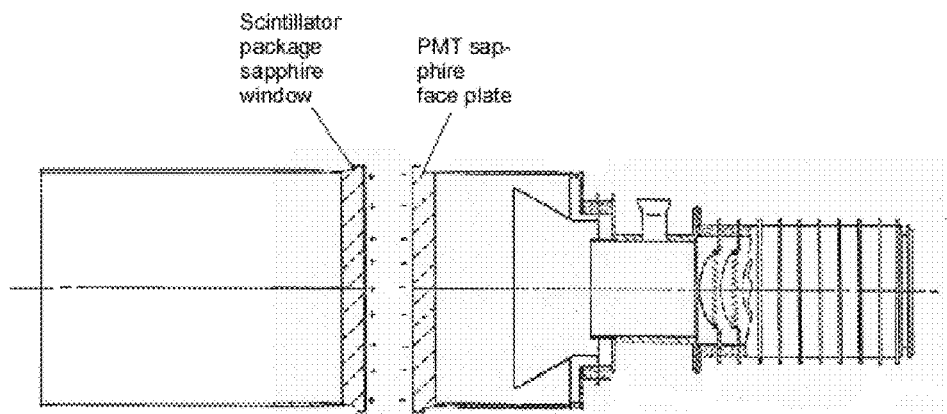
FIG. 14*a* shows a PMT on right with sapphire window and crystal housing on left with sapphire window. The surface of the crystal window is charged positively and the PMT window is charged negatively.
Figure 14B:
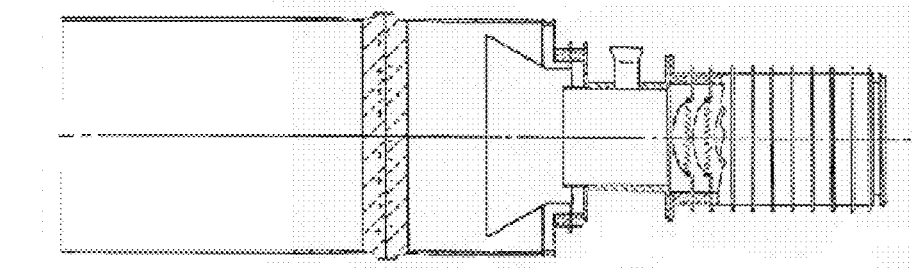
FIG. 14*b* shows when placed together, electrostatic forces join the two windows tightly together, forming an optical medium through which light from the scintillator can pass with little in the way of reflections from the joint.

FIG. 14 shows an embodiment similar to that of FIG. 13, that both the crystal housing and the PMT have a sapphire window and the two windows are joined tightly together electrostatically. Prior to joining, one surface is charged negatively and the other is charged positively. Various methods of charging are available but one preferred method is to charge one of the surfaces by $Al^+$ implantation and to charge the other surface by $O^-$ implantation. These components are chosen because they are the same elements of which the sapphire is composed, forming a very strong bond when the two surfaces are joined. For this method to succeed, the surfaces need to be extremely flat ($\ll \frac{1}{2}\lambda$, where $\lambda$ is the wavelength of the incident light) and polished. This may require re-polishing the surface of the PMT window after the deposition of the photocathode.

Figure 15:
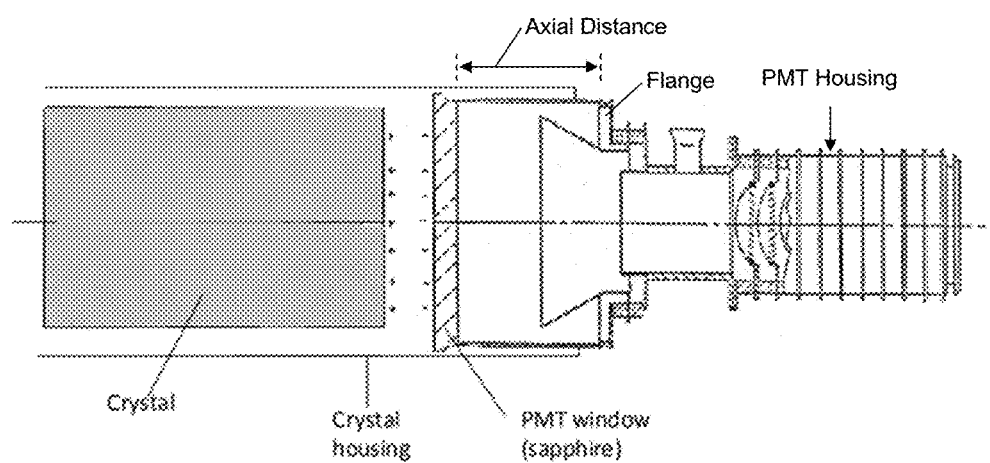
FIG. 15 shows a PMT on the right with a sapphire window and a crystal housing attached to a KOVAR material window flange. The surface of the crystal is charged positively and the PMT window is charged negatively. When placed together, electrostatic forces join the crystal and window tightly together, allowing light to pass directly into the window without an optical coupling.

FIG. 15 shows an example in which the crystal surface and window surface are charged to opposite polarities so that the electrostatic forces directly join the two surfaces, without requiring an optical coupling pad or grease. This eliminates one optical interface and one material (the coupling pad or grease) which generally causes an index of refraction mismatch to both the scintillator and the PMT window. As a result, this embodiment is much more efficient at transmitting light from the scintillator to the PMT cathode.

Another way to obtain a tight bond between the two surfaces is thermal bonding, shown in FIG. 15. This involves coupling between the crystal surface and window surface by optical contact of the precision-polished crystal and PMT window surfaces and subsequent thermal treatment to increase the bond strength. In this case Van-der-Waals intermolecular forces will act as attractive forces to couple the components.

In yet another embodiment, a bond between a sapphire faceplate and a scintillation crystal can be achieved if both materials contain elements that make it possible to produce an interface layer on the surface of either of: the faceplate, the scintillator or both, to obtain a tight bond when joining the surfaces. This can be achieved with Al-Perovskite of the form $ABO_3$, where B denotes Aluminum and A can be any other suitable element like Lu or Y, or other rare earth element and joining it to sapphire ($Al_2O_3$). One example would be joining LuAP to a sapphire face plate. This can be achieved by implanting (e.g. ion implantation) a small amount of Lu in the surface of the sapphire. Such implantation creates a shallow lattice distortion approaching the $ABO_3$ Perovskite structure to obtain a solid bond between the sapphire and the scintillator. The same approach can be used with YAP scintillators, e.g. YAP:Ce, YAP:Pr, and the like, or mixed Lu—Y scintillators (LuYAP) by implanting Y and/or Lu. The application is not limited to perovskites. Al-garnet (e.g. LuAG, LuYAG, YAG) can be bonded to sapphire. In some cases, this may require surface modifications on one or both of the faceplate and the scintillator.

The approach described above can also be used to bond a silicate scintillator (e.g. GSO, YSO, LSO, LYSO, LPS) to a Quartz ($SiO_2$) window. This can be achieved by implanting Gd ions (for GSO) in the surface of the quartz window to obtain a shallow lattice distortion to allow a direct bond between Quartz and the scintillator. Quartz is used in PMTs that require windows that are transparent to far UV photons (wavelength $\lambda < 200$ nm).

If magnetic shielding is required, the scintillator housing could be formed directly of a high permeability ferromagnetic material. One such material is available as "ADMU-80", from Advanced Magnetics. The scintillator can also be surrounded by such a material.

Certain methods to reduce unwanted shock or vibration-induced counts include placing a conductive coating on the optical pad. See, for example, US Patent Application Publications 2009/0278052, and US 2011/0001054. Another technique, e.g., as shown in U.S. Pat. No. 7,675,040 introduces gases within the crystal housing that inhibit charge movement (e.g., $SF_6$). The above mentioned development is only concerned with filling the inside of a hermetically sealed scintillator package. However, shock and vibration induced counts are generated not only at the location of the optical coupling inside the detector housing. It is equally possible that such counts are caused at the interface between the packaged scintillator and the photomultiplier. To reduce this problem, the scintillator package and the PMT or at least the PMT faceplate and the adjacent optical coupling can be housed in a hermetically sealed enclosure, which is filled with a gas that impedes the movement of charges. In this way, shock or vibration induced counts due to charging of the previously mentioned optical coupling pad may be reduced or eliminated. In the case of the the previously disclosures, it is an embodiment that in any of the housing configurations discussed herein where the scintillation crystal is coupled to the PMT window by means of an optical interface device (e.g., an optical coupling pad), a thin (optically transparent) conductive coating may be applied to the surface of the PMT window to reduce or prevent discharges and therefore shock or vibration induced counts.

Also, a thin (optically transparent) conductive coating may be applied to the scintillation crystal (either to the face that is in contact with the optical coupling pad or to all faces of the crystal), also to prevent discharges. In the case of those housing configurations where the crystal is coupled directly to the PMT window without an optical coupling pad, the surfaces of the crystal not in contact with the windows may be coated with a thin (optically transparent) conductive coating to prevent electrical discharges along the crystal. Such an optical coupling can be obtained either by the deposition of a thin (transparent) metallic film or by surface modification (e.g. implantation of a material like Ti in the sapphire window).

Alternately or additionally, the reflective material in contact with the scintillation crystal may be coated with a thin (optically transparent) conductive coating to prevent electrical discharges. It is also an embodiment that, for the conventional geometries, shock or vibration induced counts due to discharges at the optical coupling pad may be reduced or eliminated by application of a thin (optically transparent) conductive coating to the PMT window and/or crystal housing window. Methods of applying a thin conductive layer to materials, including evaporation, sputtering or chemical vapor deposition (CVD), are well known in the art. Alternately, the reflective material could be a highly optically reflective metal foil such as Ag, Al or Ti. Since the surfaces of such metals may tarnish if exposed to air, enclosing them in a hermetically sealed container would prevent such deterioration.

U.S. Pat. Nos. 7,884,316, 5,869,836, and U.S. Patent Application Publication No. 2010/0193690 disclose methods of placing a shock absorbing boot around the scintillation crystal of a scintillation detector, either as a single piece boot or as boot segments spaced longitudinally along the crystal. U.S. Pat. No. 6,222,192 also discloses placing a boot along the entire length of crystal and PMT. In one example of the present invention a shock absorbing boot may be placed around the entire length of the scintillation crystal but may also extend to the point where the crystal housing is attached to the PMT (which is less than the length of the PMT). The boot may be formed of a single piece or it may be segmented along the length.

While the invention has been disclosed with reference to a limited number of example implementations, those skilled in the art, having the benefit of this disclosure will readily devise other implementations which do not exceed the scope of what has been invented. Accordingly, the invention shall be limited in scope only by the attached claims.

What is claimed is:
1. An integrated scintillation detector comprising:
a scintillation crystal and a photomultiplier having a faceplate, said photomultiplier being at least partially contained within a scintillator housing, wherein the scintillator crystal is directly attached to the photomultiplier faceplate without an optical coupling pad.
2. The integrated scintillation detector of claim 1 wherein the scintillator housing is hermetically sealed.
3. The integrated scintillation detector of claim 1 wherein the scintillator crystal is hygroscopic.

4. The integrated scintillation detector of claim 3 wherein the scintillator crystal is a material selected from the group consisting of NaI(Tl), LaBr$_3$:Ce, LaCl$_3$:Ce, CsI(Na), CsI(Tl), mixed La-halides, elpasolites, and SrI$_2$:Eu.

5. The integrated scintillation detector of claim 1 wherein the scintillator crystal is non-hygroscopic.

6. The integrated scintillation detector of claim 5 wherein the scintillator is formed from a material selected from the group consisting of BGO, LSO:Ce, GSO:CE, YAP: Ce, YAP:Pr, LuAP:Ce, and LuAG:Pr.

7. The integrated scintillation detector of claim 1, wherein the photomultiplier has a head, the head having a weld flange and wherein the scintillator housing is attached to the weld flange at an end of the photomultiplier head.

8. The integrated scintillation detector of claim 1, wherein the scintillator housing is attached to a structure selected from a metal structure and a ceramic structure positioned at a distance from the photomultiplier.

9. The integrated scintillation detector of claim 1, wherein a cylinder supports both the faceplate and the scintillator housing.

10. The integrated scintillation detector of claim 1, wherein the photomultiplier comprises a glass envelope incorporating a support for attachment of the scintillator housing wherein less than the entire photomultiplier is enclosed in the scintillator housing.

11. The integrated scintillation detector of claim 10, wherein the support is a metal ring or disk included in the glass envelope.

12. The integrated scintillation detector of claim 1 where the scintillator housing is brazed to the faceplate of the photomultiplier window at a top or a side of the faceplate.

13. The integrated scintillation detector of claim 1, wherein the scintillator housing has an endplate, the endplate being bent inward to apply a force to the scintillator crystal, pushing it against the faceplate of the photomultiplier.

14. The integrated scintillation detector of claim 1, wherein the direct attaching is achieved through opposite electrostatic charges on surfaces that are joined.

15. The integrated scintillation detector of claim 14, wherein the direct attaching between surfaces being coupled is followed by a heat treatment to solidify a bond therebetween.

16. The integrated scintillation detector of claim 1, wherein the scintillator crystal is directly affixed to the face plate by means of a bonding layer placed either on the face plate, the scintillator or both before joining thereof.

17. The integrated scintillation detector of claim 16 wherein the scintillator crystal comprises an aluminum perovskite of the form ABO$_3$, where B is aluminum and A is an element selected from the group consisting of Lu, Y and other rare earth elements and wherein the face plate is sapphire and a bonding layer is created by implanting element A in the sapphire to distort a crystalline lattice to form a thin connecting perovskite layer.

18. The integrated scintillation detector of claim 1, wherein the photomultiplier comprises a photocathode, the photocathode being deposited before attaching the scintillator housing to the photomultiplier.

19. The integrated scintillation detector of claim 1, wherein the photomultiplier comprises a photocathode, the photocathode being deposited after attaching the scintillator housing to the photomultiplier.

20. The integrated scintillation detector of claim 1, wherein at least one feature selected from the window of the scintillator housing, the scintillation crystal and the faceplate of the photomultiplier is formed from a material selected from the group consist of stainless steel, nickel ferrous alloys, titanium, aluminum, plastic and ceramic.

* * * * *